US009811890B2

(12) United States Patent
Blonde et al.

(10) Patent No.: US 9,811,890 B2
(45) Date of Patent: Nov. 7, 2017

(54) METHOD FOR OBTAINING AT LEAST ONE HIGH DYNAMIC RANGE IMAGE, AND CORRESPONDING COMPUTER PROGRAM PRODUCT, AND ELECTRONIC DEVICE

(71) Applicant: THOMSON LICENSING, Issy de Moulineaux (FR)

(72) Inventors: Laurent Blonde, Thorigne-Fouillard (FR); David Touze, Rennes (FR); Valter Drazic, Betton (FR)

(73) Assignee: THOMSON LICENSING, Issy les Moulineaux (FR)

(*) Notice: Subject to any disclaimer, the term of this patent is extended or adjusted under 35 U.S.C. 154(b) by 0 days.

(21) Appl. No.: 14/879,039

(22) Filed: Oct. 8, 2015

(65) Prior Publication Data

US 2016/0104270 A1    Apr. 14, 2016

(30) Foreign Application Priority Data

Oct. 10, 2014 (EP) .................................. 14306603

(51) Int. Cl.
*G06K 9/00* (2006.01)
*G06T 5/00* (2006.01)
(Continued)

(52) U.S. Cl.
CPC ............... *G06T 5/007* (2013.01); *G06T 7/30* (2017.01); *G06T 11/001* (2013.01); *G06T 11/60* (2013.01);
(Continued)

(58) Field of Classification Search
CPC ..... G06T 5/007; G06T 7/0024; G06T 11/001; G06T 11/60; G06T 2207/10024;
(Continued)

(56) References Cited

U.S. PATENT DOCUMENTS 7,940,311 B2    5/2011 Trimeche et al.
2010/0321539 A1    12/2010 Ito
(Continued)

FOREIGN PATENT DOCUMENTS

WO    WO2012015359    2/2012

OTHER PUBLICATIONS

Varkonyi. Koczy: "Improved Fuzzy Logic Supported HDR Colored Information Enhancement" 2009 IEEE Instrumentation and Measurement Technology Conference (I2MTC); pp. 1-6.
(Continued)

*Primary Examiner* — Yon Couso

(57) ABSTRACT

In one embodiment, it is proposed a method for obtaining at least one high dynamic range image via aligning and fusion of at least two low dynamic range images. The method is remarkable in that it comprises:
  obtaining a first low dynamic range image, said first low dynamic range image comprising several color components in a color space;
  obtaining a second low dynamic range image in said color space, comprising, for at least one component color, at least a part of pixels of said second low dynamic range image, defining a region, for which Euclidean distance between a value of a pixel in said region in said second low dynamic range image and a value of a corresponding pixel in said region in said first low dynamic range image is below a threshold; and
  said aligning comprising matching features obtained from said at least one component color of said first low dynamic range image and from said at least one component color of said second low dynamic range image.

20 Claims, 2 Drawing Sheets

(51) Int. Cl.
*H04N 5/232* (2006.01)
*H04N 5/235* (2006.01)
*G06T 11/00* (2006.01)
*G06T 11/60* (2006.01)
*G06T 7/30* (2017.01)

(52) U.S. Cl.
CPC ......... *H04N 5/2355* (2013.01); *H04N 5/2356* (2013.01); *H04N 5/23232* (2013.01); *G06T 2207/10024* (2013.01); *G06T 2207/20208* (2013.01)

(58) Field of Classification Search
CPC ...... G06T 2207/20208; H04N 5/23232; H04N 5/2355; H04N 5/2356
USPC ........................................................ 382/167
See application file for complete search history.

(56) References Cited

U.S. PATENT DOCUMENTS

| | | | |
|---|---|---|---|
| 2011/0176024 A1 | 7/2011 | Kwon et al. | |
| 2011/0188744 A1* | 8/2011 | Sun | G06T 5/50 382/162 |
| 2011/0211732 A1* | 9/2011 | Rapaport | G06F 3/1454 382/107 |
| 2012/0162366 A1 | 6/2012 | Ninan et al. | |
| 2012/0288217 A1* | 11/2012 | Zhai | G06T 5/50 382/294 |
| 2013/0044127 A1* | 2/2013 | Wu | G06T 5/009 345/629 |
| 2013/0128027 A1 | 5/2013 | Katsurada et al. | |
| 2013/0223690 A1* | 8/2013 | Criminisi | G06T 5/008 382/106 |
| 2014/0063300 A1 | 3/2014 | Lin et al. | |
| 2014/0204246 A1 | 7/2014 | Nishi | |

OTHER PUBLICATIONS

Varkonyi et al: "Gradient-Based Synthesized Multiple Exposure Time Color HDR Image"; IEEE Transactions on Instrumentation and Measurement ; vol. 57 (No. 8): pp.1779-1785; Aug. 2008.
Schechner et al: "Generalized Mosaicing: High Dynamic Range in a Wide Field of View"; International Journal of Computer Vision; vol. 53(No. 3), pp. 245-267, (2003).
Nixon et al: "Feature Extraction and Image Processing" published by Newnes; 2002; pp. 1-360.
Eisner et al: "Blue-sensitive cones do not contribute to luminance"; published in JOSA; vol. 70, No. 1 (Jan. 1980); pp. 121-123.
Lowe: "Distinctive Image Features from Scale Invariant Features from Scale Invariant Features"; Jan. 5, 2004; pp. 1-28.
Ali et al: "A survey of HDR Images and Image Fusioning Techniques"; International Journal of Advanced Research in Computer Science and Software Engineering; in Mar. 2014; vol. 4, Issue 3; pp. 377-382.
Search Report Dated March 23, 2015.
Curcio CA , Allen KA, Sloan KR, Lerea CL, Hurley JB, Klock IB, Milam AH: "Distribution and morphology of human cone photoreceptors stained with anti-blue opsin" J Comp Neural. Oct. 22, 1991;312(4):610-24.-Abstract.

* cited by examiner

METHOD FOR OBTAINING AT LEAST ONE HIGH DYNAMIC RANGE IMAGE, AND CORRESPONDING COMPUTER PROGRAM PRODUCT, AND ELECTRONIC DEVICE

This application claims the benefit, under 35 U.S.C. §119 of European Patent Application No. 14306603.3, filed Oct. 10, 2014.

TECHNICAL FIELD

This disclosure concerns the obtaining of high dynamic range images from low dynamic range images.

BACKGROUND

This section is intended to introduce the reader to various aspects of art, which may be related to various aspects of the present disclosure that are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Sensors in digital cameras have a limited dynamic range that hinder to obtain all the details in scenes with difficult illumination. Therefore, when taking a photo, the user is faced with the choice of either rendering details in shadow areas and overexposing the highlights, or exposing for highlights but losing details in darker zones. In order to overcome this issue, HDR (which stands for "High-Dynamic-Range") imaging techniques can be used, which aim is to reproduce a greater dynamic range of luminosity than possible using standard digital imaging or photographic (i.e. classical sensors in the sense that these sensors have a limited dynamic range). In order to achieve this result, one technique relies on the taking of multiple acquisitions of a same scene but at different exposure. Such technique is called a bracketing technique. Once these multiple images are obtained, they are aligned (or registered) and merged (or fused) into one single HDR image. The image registration/aligning process is the process of aligning (from a spatial point of view) the images of a same scene in order to compensate for camera movement between the shots performed during the take of multiple acquisitions. Indeed, this aligning process is necessary to avoid the obtaining of a blurry HDR image. However, this is a very costly operation both computationally and memory-wise.

The present disclosure aims at speeding up the aligning process when obtaining/generating an HDR image, as well as improving the quality of the obtained HDR image in some embodiments of the disclosure.

It should be noted that the present disclosure can also be used in order to generate an HDR image from a 3D camera.

SUMMARY

References in the specification to "one embodiment", "an embodiment", "an example embodiment", indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

A first aspect of the present disclosure is directed to a method for obtaining at least one high dynamic range image via aligning and fusion of at least two low dynamic range images. Such method for obtaining comprises:
- obtaining a first low dynamic range image, said first low dynamic range image comprising several color components in a color space;
- obtaining a second low dynamic range image in said color space, comprising, for at least one component color, at least a part of pixels of said second low dynamic range image, defining a region, for which Euclidean distance between a value of a pixel in said region in said second low dynamic range image and a value of a corresponding pixel in said region in said first low dynamic range image is below a threshold; and
- said aligning comprising matching features obtained from said at least one component color of said first low dynamic range image and from said at least one component color of said second low dynamic range image.

It should be noted that the at least one high dynamic range image has a greater dynamic range of luminosity than the low dynamic range images.

For one skilled in the art, the corresponding pixel in the region is also named a co-located pixel, and the aligning corresponds to an image registration step (as explained in the article: "*Generalized Mosaicinq: High Dynamic Range in a Wide Field of View*" by Yoav Y. Schechner and Shree K. Nayar, published in the International Journal of Computer Vision 53(3), 245-267, 2003).

Hence, said at least one component color is a common component color for which co-located pixels are close (in the sense of a metric, i.e. Euclidian distance). Such feature eases the aligning/registration of low dynamic range images.

In one embodiment, the region is a connected space. In another embodiment, the region is a disconnected space.

In a preferred embodiment, said color space is a Red, Green, Blue color space, and said at least one component color is a blue component of said Red, Green, Blue color space.

More precisely, the at least one component color which is a blue component corresponds to acquired or represented wavelengths below 480 nm.

In a preferred embodiment, said features correspond to pixels values.

In a preferred embodiment, said features are key points descriptors obtained by using a scale invariant feature transform method.

In one embodiment of the disclosure, one skilled in the art could applied feature extraction techniques as described in the book: "*Feature Extraction and Image Processing*" by Mark S. Nixon and Alberto S. Aguado, published by Newnes, in order to get features to be matched.

In a preferred embodiment, such method further comprises reducing a number of key points descriptor by a use of a RANSAC algorithm.

In a preferred embodiment, said matching comprises applying a median bitmap transform.

In a preferred embodiment, said at least one component color is obtained by an intermediate exposure, whereas other component colors are either obtained by over exposure or under exposure.

In a preferred embodiment, said obtaining said second low dynamic range image is done via exposure bracketing.

In a preferred embodiment, said obtaining said second low dynamic range image is done via a use of a synopter and a 3D camera.

In a preferred embodiment, said region comprises at least 15% of pixels comprised in said first and second low dynamic range images.

In that case, only a few part of the pixels comprised in the image are chosen to be closed in order to ease the aligning (or registration) step.

In a preferred embodiment, said region comprises at least 50% of pixels comprised in said first and second low dynamic range images.

In that case, more pixels comprised in the image are chosen to be closed in order to ease the aligning (or registration) step.

In a preferred embodiment, said region comprises at least 80% of pixels comprised in said first and second low dynamic range images.

In a preferred embodiment, said region comprises all the pixels comprised in said first and second low dynamic range images.

In a preferred embodiment, said threshold is below 10.

In a preferred embodiment, said threshold is below 5.

In a preferred embodiment such method comprises obtaining several low dynamic range images.

In another embodiment, it is also proposed a method for generating at least two low dynamic range images, that have, for a at least one common component color, at least a part of co-located pixels in said at least two low dynamic range images, for which Euclidean distance between co-located pixels in said at least two low dynamic range images is below a threshold.

Said at least two low dynamic range images are images of a same scene. According to an exemplary implementation, the different steps of the method are implemented by a computer software program or programs, this software program comprising software instructions designed to be executed by a data processor of a relay module according to the disclosure and being designed to control the execution of the different steps of this method.

Consequently, an aspect of the disclosure also concerns a program liable to be executed by a computer or by a data processor, this program comprising instructions to command the execution of the steps of a method as mentioned here above.

This program can use any programming language whatsoever and be in the form of a source code, object code or code that is intermediate between source code and object code, such as in a partially compiled form or in any other desirable form.

The disclosure also concerns an information medium readable by a data processor and comprising instructions of a program as mentioned here above.

The information medium can be any entity or device capable of storing the program. For example, the medium can comprise a storage means such as a ROM (which stands for "Read Only Memory"), for example a CD-ROM (which stands for "Compact Disc-Read Only Memory") or a microelectronic circuit ROM or again a magnetic recording means, for example a floppy disk or a hard disk drive.

Furthermore, the information medium may be a transmissible carrier such as an electrical or optical signal that can be conveyed through an electrical or optical cable, by radio or by other means. The program can be especially downloaded into an Internet-type network.

Alternately, the information medium can be an integrated circuit into which the program is incorporated, the circuit being adapted to executing or being used in the execution of the method in question.

According to one embodiment, an embodiment of the disclosure is implemented by means of software and/or hardware components. From this viewpoint, the term "module" can correspond in this document both to a software component and to a hardware component or to a set of hardware and software components.

A software component corresponds to one or more computer programs, one or more sub-programs of a program, or more generally to any element of a program or a software program capable of implementing a function or a set of functions according to what is described here below for the module concerned. One such software component is executed by a data processor of a physical entity (terminal, server, etc.) and is capable of accessing the hardware resources of this physical entity (memories, recording media, communications buses, input/output electronic boards, user interfaces, etc.).

Similarly, a hardware component corresponds to any element of a hardware unit capable of implementing a function or a set of functions according to what is described here below for the module concerned. It may be a programmable hardware component or a component with an integrated circuit for the execution of software, for example an integrated circuit, a smart card, a memory card, an electronic board for executing firmware etc.

It should be noted that a step of obtaining an element/value in the present document can be viewed either as a step of reading such element/value in a memory unit of an electronic device or a step of receiving such element/value from another electronic device via communication means.

In another embodiment, it is proposed an electronic device configured to obtain at least one high dynamic range image via means for aligning and means for performing a fusion of at least two low dynamic range images. The electronic device comprises:

means for obtaining a first low dynamic range image, said first low dynamic range image comprising several color components in a color space;

means for obtaining a second low dynamic range image in said color space, comprising, for at least one component color, at least a part of pixels of said second low dynamic range image, defining a region, for which Euclidean distance between a value of a pixel in said region in said second low dynamic range image and a value of a corresponding pixel in said region in said first low dynamic range image is below a threshold; and said means for aligning comprising means for matching features obtained from said at least one component color of said first low dynamic range image and from said at least one component color of said second low dynamic range image.

In one embodiment, the previous mentioned means are implemented in an electronic device as depicted in FIG. 2.

In another embodiment, it is proposed an electronic device configured to obtain at least one high dynamic range image via a first module configured to align at least two low dynamic range images and a second module configured to perform a fusion of said at least two low dynamic range images. Such electronic device comprises:

a third module configured to obtain a first low dynamic range image, said first low dynamic range image comprising several color components in a color space;

a fourth module configured to obtain a second low dynamic range image in said color space, comprising, for at least one component color, at least a part of pixels of said second low dynamic range image, defining a region, for which Euclidean distance between a value of a pixel in said region in said second low dynamic range image and a value of a corresponding pixel in said region in said first low dynamic range image is below a threshold; and said first module comprising for a fifth module configured to match features obtained from said at least one component color of said first low dynamic range image and from said at least one component color of said second low dynamic range image.

In another embodiment, it is also proposed an electronic device configured to generate at least two low dynamic range images, that have, for a at least one common component color, at least a part of co-located pixels in said at least two low dynamic range images, for which Euclidean distance between co-located pixels in said at least two low dynamic range images is below a threshold.

BRIEF DESCRIPTION OF DRAWINGS

The above and other aspects of the disclosure will become more apparent by the following detailed description of exemplary embodiments thereof with reference to the attached drawings in which.

Figure 1:
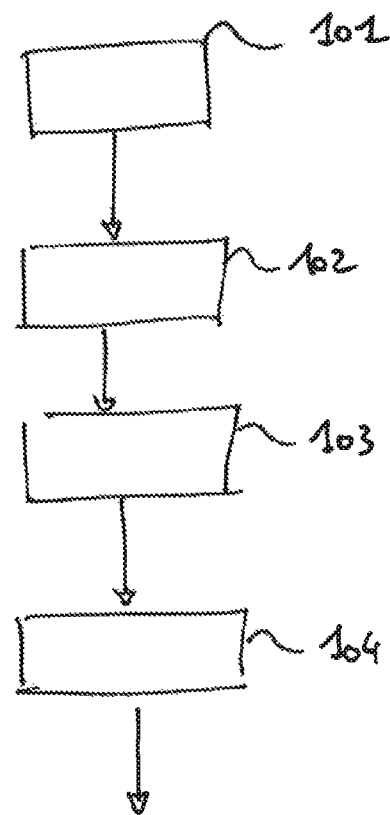
FIG. 1 presents an HDR image generation process, in the form of a flowchart, according to one embodiment of the disclosure.

DETAILED DESCRIPTION OF EMBODIMENTS
OF THE DISCLOSURE

Usually in the state of the art, in order to generate an HDR image, one skilled in the art uses exposure bracketing in order to generate at least two different low dynamic range images that are then aligned and fused. Indeed, a first low dynamic range image is obtained via overexposure of a digital camera (for example a DSLR (for Digital Single-lens Reflex) camera), and a second low dynamic range image is obtained via underexposure of the same digital camera. Each of the low dynamic range images has several color components/channels in a color space (for example three components/channels in the RGB (which stands for Red, Green and Blue) color space, or four components in the CMYK (which stands for Cyan, Magenta, Yellow, and Key (Black)) color space, etc.). However, as the first low dynamic range image is generated via overexposed parameters, all the color components of the first low dynamic range image are considered as being overexposed. In the same way, as the second low dynamic range image is generated via underexposed parameters, all the color components of the second low dynamic range image are considered as underexposed.

The proposed disclosure proposes to modify the acquisition (or the obtaining) of the low dynamic range images in such way that, when performing exposure bracketing, two low dynamic range images (an overexposed image and a underexposed image) have, for at least one color component, similar/close values that correspond to an average exposure of the camera. The average exposure corresponds to an exposure that is chosen to obtain a well-balanced LDR picture (minimizing both over and under expositions). Obviously, in another embodiment, in order to generate one high dynamic range image, several (i.e. more than or equal to three) low dynamic range images with at least color component, for which similar or close values of pixels are present, are used.

Hence, for example in the case that the color space is the RGB space, each component/channel is represented by 8 bits, and the first low dynamic range image has:
Pixel values in the red component that correspond to values induced by an overexposure. The whole set of values is noted R1;
Pixel values in the green component that correspond to value induced by an overexposure. The whole set of values is noted G1; and
Pixel values in the blue component that correspond to value induced by an intermediate exposure. The whole set of values is noted B1.

The second low dynamic range image (still obtained during an exposure bracketing) has:
Pixel values in the red component that correspond to values induced by an underexposure. The whole set of values is noted R2;
Pixel values in the green component that correspond to values induced by an underexposure. The whole set of values is noted G2; and
Pixel values in the blue component that correspond to values induced by an intermediate exposure. The values in the blue component of the first and second low dynamic range images should be similar, or at least relatively closed. The whole set of values is noted B2.

In order to determine that values are close, the Euclidian distance between these values should not exceed a threshold. One skilled in the art could adapt the value of the threshold in order to have either an accurate result (when the threshold is small; in that case, the error tolerance at the acquisition is small) or a less accurate result (in that case, the error tolerance at the acquisition is larger). It should be noted that in another embodiment, the pixel value of the first low dynamic range image or the second low dynamic range image is represented by 10 bits, or 12 bits. In that case, the threshold to be used in order to define close pixels should take into account the size (in bits) of the representation of the pixels. For example, in one embodiment of the disclosure, when a pixel is represented by 8 bits, the threshold could be set up at the value 10. In another embodiment of the disclosure, when a pixel is represented by 10 bits, the threshold could be set up at the value 20. Hence, one skilled in the art could adapt the value of the threshold according to the representation size of a pixel. In the state of the art, the wording "Bit depth" can be used when dealing with the representation size of a pixel. Indeed, the bit depth is defined as the number of bits used to describe a pixel. Obviously, the greater the number of bits per pixel is, the better the image is.

In the previous described example, the selected color component is the blue one. However, in another embodiment of the disclosure, it can be the green color component that is chosen to have values induced by an intermediate exposure.

In another embodiment, when the color space is the CMYK color space, the two following color components Cyan and Yellow can be forced to be obtained with an intermediate exposure.

In order to achieve such result, one can use images sensor pixels (i.e. CMOS or CCD image sensor) in a sensor array of an acquisition device (such as a DSLR camera, or a classical digital camera) that can be individually or grouped controlled. For example, one can use the technique described in the document US 2014/0063300 A1. For example, in the case that a Bayer filter is used in combination with a sensor array comprising several image sensor pixels (as the one depicted in FIG. 3 of the document US 2014/0063300 A1), it is possible to control the time exposure (and therefore acquisition) on each of the color channels/components. In other embodiment of the disclosure, the technique can be used with other color filters (CYGM filter, RGBW filter, RGBE filter, etc.).

FIG. 1 presents an HDR image generation process, in the form of a flowchart, according to one embodiment of the disclosure.

In one embodiment of the disclosure, a device (for example as the one depicted in the FIG. 2) comprised or combined with a digital camera performs the following steps in order to generate an HDR image:

In a step, referenced 101, a user selects at least one color channel/component for easing the obtaining of an HDR image. In order to select such least one color channel/component, a particular display device can propose to the user a list of color component/channel in which the user can select one or several elements. In other embodiment, the selection process is done automatically by the device (without requiring selection inputs from the user). In one embodiment of the disclosure, when the color space is the RGB color space (or a similar color space), the device can always select the blue channel/component due to the following reasons:

- the color blue has a low contribution to luminance as reflect the RGB to XYZ conversion matrices of various color representations (sRGB, Adobe RGB1998, SMPTE C RGB, . . . ) taking as example sRGB (defined by IEC 61966 specification), luminance Y is given by Y=0.2126 R_linear+0.7152 G_linear+0.0722 B_linear. The blue channel contribution to luminance is around 10 times smaller than the green channel contribution and around 3 times smaller than the blue channel contribution;
- vision science studies support the low weight allocated to the blue color by stating that blue-sensitive cones do not contribute to luminance perception. Such approach is described in the article "*Blue-sensitive cones do not contribute to luminance*", by Eisner, Alvin, and Donald I A MacLeod, and published in JOSA 70, no. 1 (1980): 121-123;
- Human visual acuity is much smaller the blue region of the spectrum due to a very reduced number of blue sensitive cones in the fovea compared to green and red sensitive cones. These specificities result from physiological differences between blue sensitive cones (S-cones) and red/green sensitive cones (L-&M-cones). The following publication gives indications concerning an experiment characterizing blue cone in humans: "*Distribution and morphology of human cone photoreceptors stained with anti-blue opsin*" by C. A. Curcio et al, published in the Journal of comparative neurology, volume 312, Issue 4, pages 610-624, 22 Oct. 1991; and
- Another factor may be chromatic aberration of the eye optics potentially enlarging the point spread function and this reducing acuity for the blue wavelengths.

In a step, referenced 102, the device adapts a spectral sensitivity in the at least one selected color channel/component provided in output of the step 101. The adaptation is done by configuring optical and/or electronic means of a device that must acquire images.

In one embodiment of the disclosure, images sensor pixels (as the one depicted in FIG. 3 of the document US 2014/0063300 A1) are controlled in order to enable the generation of the set R1, G1, B1, R2, G2 and B2 as mentioned previously. In another embodiment of the disclosure, when a 3D camera is used in combination with a synopter (as in the document US2012162366), particular color optical filters (with special spectral transmission profiles) can be positioned at the outputs of the synopter.

In a step, referenced 103, the device launches the acquisition of at least first and second low dynamical images either via the bracketing technique or via the use of a synopter that use the parameters defined in the step 102.

At last, in a step referenced 104, the device generates an HDR image based on the combining of the first and second low dynamical range images provided in output of step 103. More precisely, the generation comprises an aligning and fusing process that takes into account the property relative to a common color component (common in term of values). Indeed, if the camera moves during a capture of the first and second low dynamical images, the use of the common color component enables the aligning of the bracketed images. More precisely, a deformation model between the first and second low dynamical images can be estimated via the processing of the common color component of these acquired images.

More precisely, a spatial matching between the set of values B1 and B2 is done in order to obtain a deformation model which is a mathematical model that defines the geometric deformation between the two images (such a translation, or a combination of a rotation and a translation, or even a similitude). In one embodiment, such spatial matching can be done by using the MTB (for Median Threshold Bitmap) technique described in the article "*Fast, Robust Image Registration for Compositing High Dynamic Range Photographs from Handheld Exposures*" by G. Ward. In another embodiment, the SIFT (for Scale Invariant Feature Transform) technique described in the article "*Distinctive Image Features from Scale Invariant Features*" by D. G. Lowe can be used.

Once the deformation model is obtained, it is used in order to align the others sets of values G1 and G2, as well as R1 and R2.

Then a fusion (or merging) process is performed by the device. Know techniques such as the one described in the article "*A survey of HDR Images and Image Fusioning Techniques*" by B. F. Ali et al., published in the International Journal of Advanced Research in Computer Science and Software Engineering, in March 2014.

Figure 2:
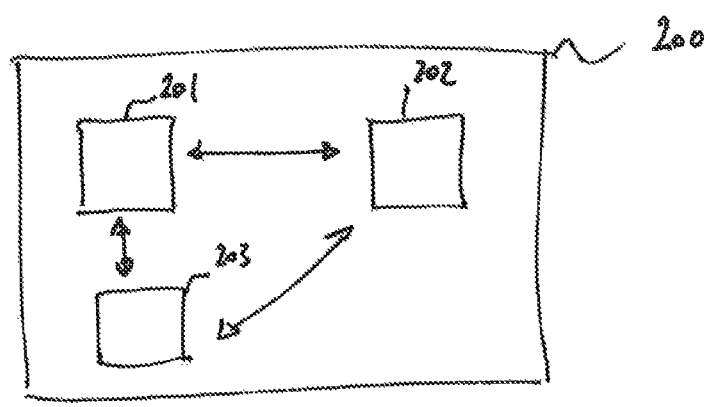
FIG. 2 presents an example of a device that can be used to perform one or several steps of methods disclosed in the present document.

FIG. 2 presents an example of a device that can be used to perform one or several steps of methods disclosed in the present document.

Such device referenced 200 comprises a computing unit (for example a CPU, for "Central Processing Unit"), referenced 201, and one or more memory units (for example a RAM (for "Random Access Memory") block in which intermediate results can be stored temporarily during the execution of instructions a computer program, or a ROM block in which, among other things, computer programs are stored, or an EEPROM ("Electrically-Erasable Programmable Read-Only Memory") block, or a flash block) referenced 202. Computer programs comprise instructions that can be executed by the computing unit. Such device 200 can also comprise a dedicated unit, referenced 203, constituting an input-output interface to allow the device 200 to communicate with other devices. In particular, this dedicated unit 203 can be connected with an antenna (in order to perform communication without contacts), or with serial ports (to carry communications "contact"). It should be noted that the arrows in FIG. 2 signify that the linked unit can exchange data through buses for example together.

In an alternative embodiment, some or all of the steps of the method previously described, can be implemented in hardware in a programmable FPGA ("Field Programmable Gate Array") component or ASIC ("Application-Specific Integrated Circuit") component.

In an alternative embodiment, some or all of the steps of the method previously described, can be executed on an electronic device comprising memory units and processing units as the one disclosed in the FIG. 2.

The invention claimed is:

1. A method for obtaining at least one high dynamic range image comprising aligning at least two low dynamic range images, wherein said method for obtaining comprises:
    obtaining a first low dynamic range image, said first low dynamic range image comprising several color components in a color space;
    obtaining a second low dynamic range image in said color space, comprising, for only one component color, at least a part of pixels of said second low dynamic range image, defining a region, wherein a luminance value of a pixel in said region in said second low dynamic range image and a luminance value of a corresponding pixel in said region in said first low dynamic range image are close values; and
said aligning comprising matching features obtained from said only one component color of said first low dynamic range image and from said only one component color of said second low dynamic range image.

2. The method for obtaining according to claim 1, wherein said color space is a Red, Green, Blue color space, and said only one component color is a blue component of said Red, Green, Blue color space.

3. The method for obtaining according to claim 1, wherein said features correspond to pixels luminance values.

4. The method for obtaining according to claim 1, wherein said features are key points descriptors obtained by using a scale invariant feature transform method.

5. The method for obtaining according to claim 4, wherein it further comprises reducing a number of key points descriptor by a use of a RANSAC algorithm.

6. The method for obtaining according to claim 3, wherein said matching comprises applying a median bitmap transform.

7. The method for obtaining according to claim 1, wherein said only one component color is obtained by an intermediate exposure, whereas other component colors are either obtained by over exposure or under exposure.

8. The method for obtaining according to claim 1, wherein said obtaining said second low dynamic range image is done via exposure bracketing.

9. The method for obtaining according to claim 1, wherein said obtaining said second low dynamic range image is done via a use of a synopter and a 3D camera.

10. The method for obtaining according to claim 1, wherein said region comprises at least 15% of pixels comprised in said first and second low dynamic range images.

11. The method for obtaining according to claim 1, wherein said region comprises at least 50% of pixels comprised in said first and second low dynamic range images.

12. The method for obtaining according to claim 1, wherein said region comprises at least 80% of pixels comprised in said first and second low dynamic range images.

13. The method for obtaining according to claim 1, wherein said region comprises all the pixels comprised in said first and second low dynamic range images.

14. The method for obtaining according to claim 1, wherein said luminance value of a pixel in said region in said second low dynamic range image and said luminance value of a corresponding pixel in said region in said first low dynamic range image are close values when an Euclidan distance between said luminance value of a pixel in said region in said second low dynamic range image and said luminance value of a corresponding pixel in said region in said first low dynamic range image is below a threshold, and said threshold is below an Euclidean distance of 10 in decimal value.

15. The method for obtaining according to claim 1, wherein said luminance value of a pixel in said region in said second low dynamic range image and said luminance value of a corresponding pixel in said region in said first low dynamic range image are close values when an Euclidian distance between said luminance value of a pixel in said region in said second low dynamic range image and said luminance value of a corresponding pixel in said region in said first low dynamic range image is below a threshold, and said threshold is below an Euclidean distance of 5 in decimal value.

16. The method for obtaining according to claim 1, wherein it comprises obtaining several low dynamic range images.

17. A computer-readable and non-transient storage medium storing a computer program comprising a set of computer-executable instructions to implement a method for obtaining at least one high dynamic range image when the instructions are executed by a computer, wherein the instructions comprise instructions, which when executed, configure the computer to perform a method for obtaining at least one high dynamic range image comprising aligning at least two low dynamic range images, wherein said method for obtaining comprises:
    obtaining a first low dynamic range image, said first low dynamic range image comprising several color components in a color space;
    obtaining a second low dynamic range image in said color space, comprising, for only one component color, at least a part of pixels of said second low dynamic range image, defining a region, wherein a luminance value of a pixel in said region in said second low dynamic range image and a luminance value of a corresponding pixel in said region in said first low dynamic range image are close values; and
said aligning comprising matching features obtained from said only one component color of said first low dynamic range image and from said only one component color of said second low dynamic range image.

18. An electronic device comprising:
at least one memory; and
a processor coupled to said at least one memory, said processor being configured to obtain at least one high dynamic range image, wherein said processor is further configured to:
    align at least two low dynamic range images,
    obtain a first low dynamic range image, said first low dynamic range image comprising several color components in a color space;
    obtain a second low dynamic range image in said color space, comprising, for only one component color, at least a part of pixels of said second low dynamic range image, defining a region, wherein a luminance value of a pixel in said region in said second low dynamic range image and a luminance value of a corresponding pixel in said region in said first low dynamic range image are close values; and match features obtained from said only one component color of said first low dynamic range image and from said only one component color of said second low dynamic range image.

19. A method for generating at least two low dynamic range images, wherein the method comprises acquiring a first and a second low dynamic range images that have, for only one common component color, at least a part of co-located pixels in said first and a second low dynamic range images, wherein co-located pixels luminance values in said first and second low dynamic range images are close values.

20. An electronic device comprising at least one memory and a processor coupled to said at least one memory, said processor being configured to generate at least two low dynamic range images, wherein said processor is further configured to acquire a first and a second low dynamic range images that have, for only one common component color, at least a part of co-located pixels in said first and a second low dynamic range images, wherein co-located pixels luminance values in said first and a second low dynamic range images are close values.

* * * * *